(12) United States Patent
Kang (10) Patent No.: US 11,431,049 B2
(45) Date of Patent: Aug. 30, 2022

(54) BATTERY MODULE MOUNTING TRAY

(71) Applicant: SAMSUNG SDI CO., LTD., Yongin-si (KR)

(72) Inventor: Deok Jo Kang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 706 days.

(21) Appl. No.: 15/382,175

(22) Filed: Dec. 16, 2016

(65) Prior Publication Data
US 2017/0200924 A1    Jul. 13, 2017

(30) Foreign Application Priority Data

Jan. 7, 2016 (KR) .......................... 10-2016-0002173

(51) Int. Cl.
*H01M 50/20* (2021.01)

(52) U.S. Cl.
CPC ........ *H01M 50/20* (2021.01); *H01M 2220/20* (2013.01); *H01M 2220/30* (2013.01)

(58) Field of Classification Search
CPC ... H01M 2/1022; H01M 2/1077; H01M 50/20
See application file for complete search history.

(56) References Cited

U.S. PATENT DOCUMENTS

| | | | | |
|---|---|---|---|---|
| 6,085,854 A | * | 7/2000 | Nishikawa | .......... H01M 10/625 180/68.5 |
| 9,054,360 B2 | | 6/2015 | Yi et al. | |
| 2005/0202315 A1 | | 9/2005 | Sugeno et al. | |
| 2010/0003585 A1 | | 1/2010 | Takahashi et al. | |
| 2010/0151313 A1 | | 6/2010 | Kosugi | |
| 2012/0156539 A1 | | 6/2012 | Honjo et al. | |

(Continued)

FOREIGN PATENT DOCUMENTS

| | | | |
|---|---|---|---|
| JP | 2009274666 A | * | 11/2009 |
| JP | 2013-214534 A | | 10/2013 |

(Continued)

OTHER PUBLICATIONS

JP2009274666A Original and Translation from Espacenet (Year: 2009).*

(Continued)

*Primary Examiner* — Nathanael T Zemui
(74) *Attorney, Agent, or Firm* — Lewis Roca Rothgerber Christie LLP (57) ABSTRACT

Provided is a battery module mounting tray that may dampen impacts and vibrations, which may occur during the transportation of a battery module, by including a bracket to fix a side of the battery module. A battery module mounting tray includes: a bottom plate configured to support a plurality of battery modules to be seated thereon; and a bracket located on the bottom plate to fix the plurality of battery modules, and the bracket includes a first support unit to support a first side of the plurality of battery modules, a second support unit bent from both ends of the first support unit to support a portion of a side adjacent to the first side and located at an outermost side, and a third support unit extending away from a central region of the first support unit to support between the plurality of battery modules.

12 Claims, 4 Drawing Sheets

(56) References Cited

U.S. PATENT DOCUMENTS

| | | | |
|---|---|---|---|
| 2013/0052501 A1* | 2/2013 | Oyama | H01M 50/20 |
| | | | 429/96 |
| 2013/0122339 A1 | 5/2013 | Chae et al. | |
| 2014/0014428 A1* | 1/2014 | Yanagi | B60K 1/04 |
| | | | 180/68.5 |
| 2014/0212722 A1* | 7/2014 | Lee | H01M 2/1094 |
| | | | 429/99 |
| 2014/0284125 A1* | 9/2014 | Katayama | B60K 1/04 |
| | | | 180/68.5 |
| 2014/0356662 A1 | 12/2014 | Yang et al. | |
| 2014/0356664 A1 | 12/2014 | Jung | |
| 2016/0293906 A1* | 10/2016 | Ito | A01D 34/64 |

FOREIGN PATENT DOCUMENTS

| | | |
|---|---|---|
| KR | 10-2005-0075284 | 7/2005 |
| KR | 10-2005-0080343 A | 8/2005 |
| KR | 10-2007-0086461 | 8/2007 |
| KR | 10-2012-0005728 A | 1/2012 |
| KR | 10-2012-0055806 A | 6/2012 |
| KR | 10-1195888 | 10/2012 |
| KR | 10-2013-0073309 A | 7/2013 |
| KR | 10-2014-0140678 | 12/2014 |
| KR | 10-2014-0140795 | 12/2014 |

OTHER PUBLICATIONS

KIPO Notice of Allowance dated Aug. 30, 2017, for corresponding Korean Patent Application No. 10-2016-0002173 (2 pages).

KIPO Office Action dated Feb. 18, 2017, for corresponding Korean Patent Application No. 10-2016-0002173 (7 pages).

* cited by examiner

BATTERY MODULE MOUNTING TRAY

CROSS-REFERENCE TO RELATED APPLICATION

This application claims priority to and the benefit of Korean Patent Application No. 10-2016-0002173, filed on Jan. 7, 2016 in the Korean Intellectual Property Office, the entire disclosure of which is incorporated herein by reference.

BACKGROUND

1. Field

Aspects of one or more embodiments relate to battery module mounting trays.

2. Description of the Related Art

In general, battery cells are used as energy sources for various devices, such as mobile devices, electric cars, and hybrid cars, and the types thereof vary according to the types of external devices to which they are applied.

Small mobile devices, such as mobile phones, may operate for a predetermined period of time according to the capacity and power of a single battery cell. However, as in the case of electric cars and hybrid cars requiring relatively large power consumption, when long-time operation and high-power operation are required, a plurality of battery cells are electrically connected to form a large-capacity battery module in order to increase the power and capacity thereof. A battery module may increase an output voltage or an output current thereof according to the number of battery cells incorporated therein.

When mounted on a device, the large-capacity battery module uses a battery tray having a support function to fix the battery module in a device. In this case, for example, a tray for mounting a battery is installed in a device, a battery module is supported on the tray, and then a clamp or a bolt is fastened to fix the battery module in place.

The tray should be able to fix and support the battery module at a fixed position. Also, the tray should have a structure for securely fixing a battery having substantial weight so that the battery does not deviate from a mounting position due to a vibration or an impact, such as in the event of a collision.

SUMMARY

According to an aspect of one or more embodiments, a battery module mounting tray may dampen impacts and vibrations, which may occur during the transportation of a battery module, for example, by using a bracket to fix the side of the battery module. According to another aspect of one or more embodiments, a battery module mounting tray has improved vibration characteristics and assemblability.

According to another aspect of one or more embodiments, a battery module mounting tray may automatically align a screw assembly hole by forming a guide unit at a bracket to guide a seating position of a battery module.

According to another aspect of one or more embodiments, a battery module mounting tray has improved weldability to a bottom plate by forming a bracket to have a small thickness.

Additional aspects will be set forth in part in the description which follows and, in part, will be apparent from the description, or may be learned by practice of the presented embodiments.

According to one or more embodiments, a battery module mounting tray includes: a bottom plate configured to support a plurality of battery modules to be seated thereon; and a bracket located on the bottom plate to fix the plurality of battery modules, and the bracket includes a first support unit to support a first side of the plurality of battery modules, a second support unit bent from both ends of the first support unit to support a portion of a side adjacent to the first side and located at an outermost side, and a third support unit extending away from a central region of the first support unit to support between the plurality of battery modules.

The first support unit may include a bottom portion, a top portion, and a side portion connecting the bottom portion and the top portion to form an inclined "U"-like cross-sectional shape in a plane perpendicular to a lengthwise direction of the first support unit to cover the first side of the plurality of battery modules.

A length of the bottom portion of the first support unit may be greater than a length of the top portion of the first support unit.

An end portion of the second support unit may include a guide unit inclined outward at an angle (e.g., a predetermined angle).

The second support unit may include a cutaway portion that is partially cut away, and a region of the cutaway portion may be bent inward.

The third support unit may be formed integrally with the first support unit.

A coupling groove may be formed in the central region of the first support unit, an extension portion may be formed at an end portion of the third support unit, and the extension portion may be inserted and coupled into the coupling groove.

The third support unit may have a U-shaped cross-sectional shape in a plane perpendicular to a lengthwise direction of the third support unit, and may include a base portion contacting the bottom plate and a pair of sidewall portions extending upward along a lengthwise direction of the base portion to contact the plurality of battery modules.

The base portion of the third support unit may be welded to the bottom plate.

The base portion of the third support unit may have a thickness of at least about 0.8 mm.

A thickness of the base portion of the third support unit may be less than or equal to a thickness of the bottom plate.

BRIEF DESCRIPTION OF THE DRAWINGS

These and/or other aspects will become apparent and more readily appreciated from the following description of some embodiments, taken in conjunction with the accompanying drawings, in which.

DETAILED DESCRIPTION

Reference will now be made in further detail to some embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, some embodiments of the inventive concept and particular features necessary to easily understand the inventive concept will be described in further detail with reference to the accompanying drawings. However, since the inventive concept may be embodied in various different forms within the scope of the claims, the embodiments described below are merely examples despite the expression thereof.

In the following description, detailed descriptions of well-known functions or configurations may be omitted since they would unnecessarily obscure the subject matters of the inventive concept. In the specification and drawings, like reference numerals may denote like elements. Also, in the drawings, the thicknesses or sizes of components may be exaggerated for clarity and convenience of description.

Figure 1:
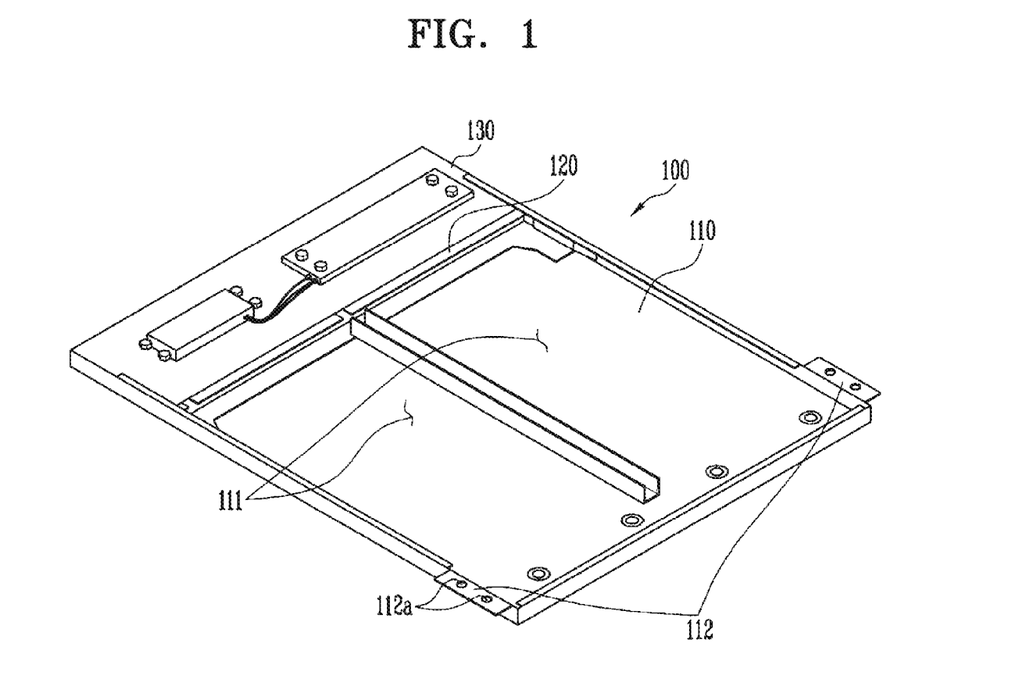
FIG. 1 is a perspective view of a battery module mounting tray according to an embodiment.
Figure 2:
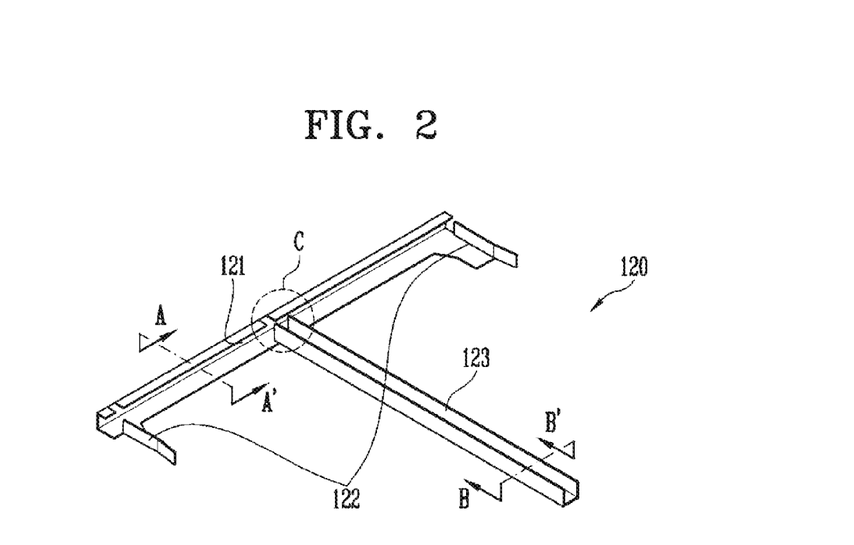
FIG. 2 is a perspective view illustrating a bracket of the battery module mounting tray of FIG. 1.

FIG. 1 is a perspective view of a battery module mounting tray according to an embodiment; and FIG. 2 is a perspective view illustrating a bracket of the battery module mounting tray of FIG. 1.

Referring to FIGS. 1 and 2, a battery module mounting tray 100 according to an embodiment includes a bottom plate 110 on which a plurality of battery modules (not illustrated) may be seated; and a bracket 120 located on the bottom plate 110 to fix the plurality of battery modules.

In an embodiment, the bracket 120 may include a first support unit 121, or first support member, to support one side of the plurality of battery modules, a second support unit 122, or second support member, bent from both ends of the first support unit 121 to support a portion of the other side of each battery module located at an outermost side, and a third support unit 123, or third support member, extending from a central region of the first support unit 121 to support between the plurality of battery modules. Herein, the other side of the battery module refers to a side that is adjacent to one side of each battery module and is located at the outermost side.

According to an embodiment, the battery module mounting tray 100 may be formed to accommodate two battery modules, and a battery module seating unit 111, or battery module seating portion, on which the battery modules are seated may be partitioned by the first support unit 121, the second support unit 122, and the third support unit 123 of the bracket 120.

The first support unit 121 of the bracket 120 may be formed in a "⊂" shape to concurrently or simultaneously cover one side of the plurality of battery modules. That is, instead of separately supporting each battery module, by concurrently or simultaneously supporting one side of the plurality of battery modules, the solidity thereof may be increased and the management point of a business may be reduced.

The third support unit 123 of the bracket 120 located between the battery modules may extend from the central region of the first support unit 121 to be located between the battery modules. In an embodiment, the third support unit 123 may be formed integrally with the first support unit 121. In an embodiment, the third support unit 123 may have a U-shaped cross-sectional shape in a plane perpendicular to a lengthwise direction of the third support unit 123 and may be fixed to the bottom plate 110 by welding. Accordingly, the third support unit 123 contacting the bottom plate 110 may be formed to have a small thickness to facilitate welding to the bottom plate 110.

A circuit unit 130, or circuit portion, may be further included on one side of the battery module seating unit 111 of the bottom plate 110. The battery module seating unit 111 and the circuit unit 130 may be partitioned by the first support unit 121 of the bracket 120.

In an embodiment, at least one fixing unit 112, or fixing portion, may be formed in a part of a circumferential region of the battery module mounting tray 100. The fixing unit 112 is configured to fix the tray 100 to a region for mounting the tray 100, and one or more fastening holes 112a may be formed in the fixing unit 112 to fix the tray 100 by a separate fastening member (not illustrated).

Figure 5:
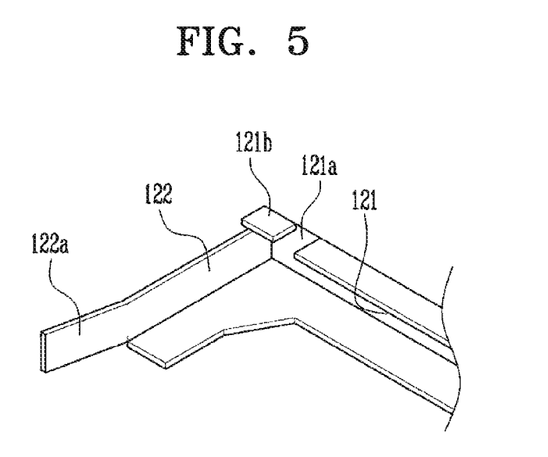
FIG. 5 is a perspective view illustrating a guide unit formed at an end portion of a second support unit of the bracket of FIG. 2.

In an embodiment, the battery modules may be assembled to the tray 100 in a sliding manner, and the battery modules may be mounted without a scratch on the tray 100 by a guide unit 122a, or guide member, formed in the second support unit 122 of the bracket 120, as illustrated in FIG. 5. This will be described later in further detail with reference to FIG. 5.

In this manner, by the bracket 120 according to the inventive concept, the sides of the battery modules may be firmly fixed to dampen vibration and impact generated, such as during the transportation of the tray 100 mounted with the battery modules. Although the battery module may be a weight of about 20 kg, the battery module may be structurally fixed by the bracket according to the inventive concept, and the assemblability thereof may be improved and the transportation and impact characteristics thereof may be improved or satisfied.

Figure 3:
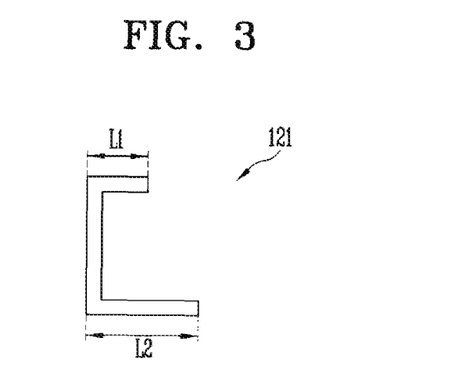
FIG. 3 is a cross-sectional view of the bracket of FIG. 2, taken along the line A-A' in FIG. 2.

FIG. 3 is a cross-sectional view of the bracket 120, taken along the line A-A' in FIG. 2.

Referring to FIG. 3, the first support unit 121 of the bracket 120 supporting one side of the plurality of battery modules may have a ⊂-shaped cross-sectional shape in a plane perpendicular to the lengthwise direction of the first support unit 121. That is, the first support unit 121, in an embodiment, includes a bottom portion, a top portion, and a side portion connecting the bottom portion and the top portion to form an inclined "U"-like cross-sectional shape in a plane perpendicular to the lengthwise direction of the first support unit 121. Thus, the first support unit 121 may concurrently or simultaneously cover one side of the plurality of battery modules, and, in an embodiment, the first support unit 121 may have a bottom portion length L2 greater than a top portion length L1 thereof.

Also, since the first support unit 121 is formed to cover one side of the battery module, it may support and fix one side of the battery module without a screw. Accordingly, the number of parts and processes thereof may be reduced and thus the manufacturing cost and process time thereof may be reduced.

Figure 4:
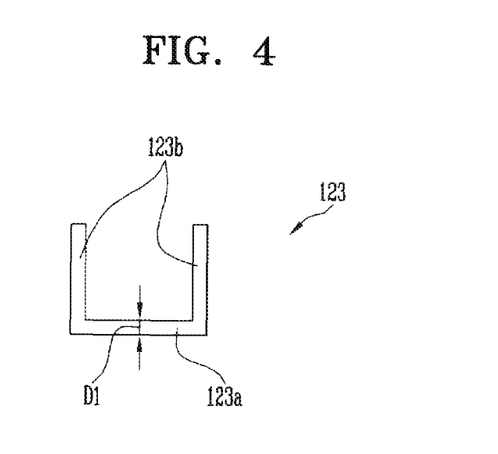
FIG. 4 is a cross-sectional view of the bracket of FIG. 2, taken along the line B-B' in FIG. 2.

FIG. 4 is a cross-sectional view of the bracket 120, taken along the line B-B' in FIG. 2.

Referring to FIG. 4, the third support unit 123 of the bracket 120 may have a U-shaped cross-sectional shape in a plane perpendicular to the lengthwise direction of the third support unit 123. That is, for example, the third support unit 123 may include a base portion 123a contacting the bottom plate 110 and a pair of sidewall portions 123b extending upward along a lengthwise direction of the base portion 123a to contact each battery module.

In an embodiment, the base portion 123a of the third support unit 123 may be fixed to the bottom plate 110 by welding. In order to facilitate the welding between the bottom plate 110 and the base portion 123a of the third support unit 123, the third support unit 123 may be formed to be thinner than the bottom plate 110. In an embodiment, spot welding may be performed and then reinforced welding may be additionally performed to fix the third support unit 123 of the bracket 120 to the bottom plate 110.

In order to improve the air-tightness, the liquid-tightness, and the joint efficiency caused by welding, two parent materials to be welded may be formed to have a thickness of at least about 0.5 mm. However, in order to resist the vibration and impact on the weight, the bottom plate 110 and the base portion 123a of the third support unit 123 may be formed to have a thickness of at least about 0.8 mm, and they may be designed in consideration of the structural aspect thereof.

Also, the welding efficiency and the rigidity thereof may be improved as the thickness of two parent materials to be welded increases. Accordingly, a thickness D1 of the base portion 123a and a thickness of the bottom plate 110 may be varied according to the weight of the seated module.

The welding efficiency may be improved when the thickness D1 of the base portion 123a is equal to or smaller than the thickness of the bottom plate 110. In this case, a welding defect rate between the bottom plate 110 and the base portion 123a may be reduced.

In an embodiment, since the base portion 123a of the third support unit 123 is formed to have a small thickness, the welding to the bottom plate 110 may be facilitated and the welding defect rate thereof may be reduced.

FIG. 5 is a perspective view illustrating a guide unit formed at an end portion of the second support unit 122 of the bracket 120.

Referring to FIG. 5, the second support unit 122 of the bracket 120 may be bent from both ends of the first support unit 121 to support a portion of the other side of each battery module located at the outermost side thereof. That is, for example, the second support unit 122 may support only a portion of the other side of each battery module on the side slid thereinto, rather than the entire other side of each battery module.

In an embodiment, an end portion of the second support unit 122 of the bracket 120 may include the guide unit 122a that is inclined outward at an angle (e.g., a predetermined angle) such that the battery module slid into the tray 100 may be seated in position. When the battery module is slid into the battery module seating unit 111, the battery module may move along the guide unit 122a to be seated in position on the battery module seating unit 111. Accordingly, since the battery module may be seated on the tray 100 without an error in the widthwise position thereof, a screw assembly hole may be automatically aligned and thus the processability thereof may be improved.

In an embodiment, a groove 121a may be formed in a partial region of the first support unit 121 that is adjacent to the second support unit 122 of the bracket 120. The groove 121a may be formed on the top side of the ⊏-shaped first support unit 121 in consideration of the shape of the battery module entering thereinto. Also, a protrusion portion 121b protruding from the first support unit 121 located outside the groove 121a may support the battery module.

Figure 6:
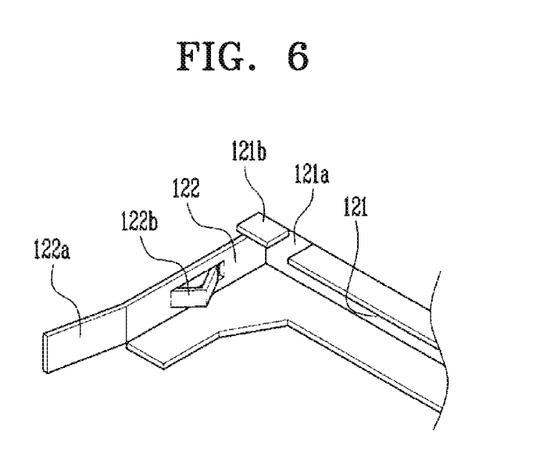
FIG. 6 is a perspective view illustrating a second support unit of the bracket of FIG. 2, according to another embodiment.

FIG. 6 is a perspective view illustrating a second support unit of the bracket of FIG. 2, according to another embodiment.

Referring to FIG. 6, the second support unit 122 of the bracket 120 may include a cutaway portion 122b that is partially cut away. A partial region of the cutaway portion 122b may be bent toward the inside of the tray 100 where the battery module is located. Accordingly, the cutaway portion 122b may be formed convexly toward the battery module seating unit 111. The cutaway portion 122b may have elasticity, and may press the other side of the battery module to fix the battery module more firmly.

In an embodiment, the cutaway portion 122b may be formed such that the front side of the second support unit 122 is cut away in the entering direction of the battery module into the battery module seating unit 111 and the rear side thereof may be folded by the elasticity from the second support unit 122. Accordingly, the battery module may not be interfered by the cutaway portion 122b even when slid into the battery module seating unit 111.

In this manner, since the second support unit 122 of the bracket 120 is used to fix the battery module more firmly, the cost thereof may be reduced in comparison with a case in which an elastic member such as a spring performing a similar function is additionally installed at the second support unit 122.

Figure 7:
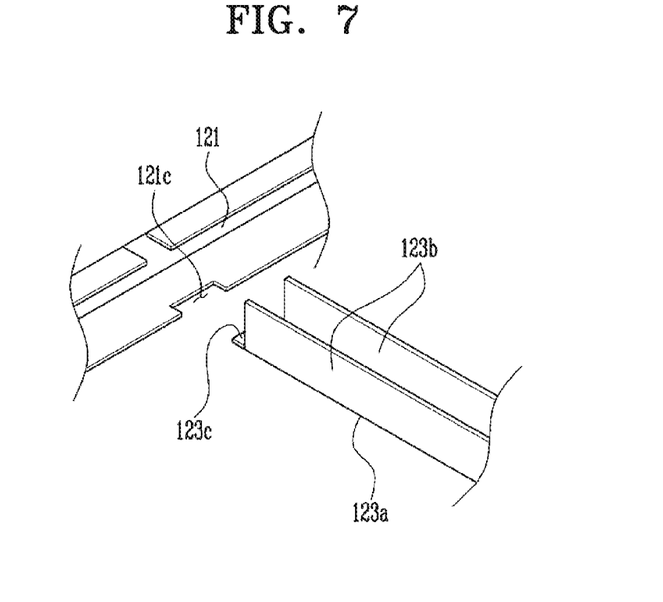
FIG. 7 is an enlarged perspective view of a region "C" in FIG. 2, illustrating a fastening relationship between a first support unit and a third support unit of the bracket, according to another embodiment.

FIG. 7 is an enlarged perspective view of a region "C" in FIG. 2, illustrating a fastening relationship between the first support unit 121 and the third support unit 123 of the bracket 120, according to another embodiment.

Referring to FIG. 7, in another embodiment, the first support unit 121 and the third support unit 123 of the bracket 120 may be separately formed and then coupled together. In an embodiment, for example, a coupling groove 121c may be formed in a central region of the first support unit 121, and an extension portion 123c may be formed at an end portion of the third support unit 123. Accordingly, the extension portion 123c of the third support unit 123 may be inserted into the coupling groove 121c of the first support unit 121, such that they may be coupled to each other.

The coupling groove 121c of the first support unit 121 may be formed on the bottom side of the ⊏-shaped first support unit 121, and the coupling groove 121c may be formed to have the same thickness as the extension portion 123c such that they may be coupled together by forced insertion. In an embodiment, for a more firm coupling between the first support unit 121 and the third support unit 123, a welding process may be additionally performed thereon after the extension portion 123c is inserted and coupled into the coupling groove 121c.

As described above, according to an aspect of the inventive concept, since the bracket may be formed to fix the side of the battery module to structurally fix the weight thereof, impacts and vibrations generated, such as during the transportation of the battery module, may be dampened and assemblability thereof may be improved.

Also, according to another aspect of the inventive concept, since the screw assembly hole may be automatically aligned by the guide unit formed at the bracket, the processability thereof may be improved.

Also, according to another aspect of the inventive concept, since the welding to the bottom plate may be facilitated by forming the bracket to have a small thickness, the welding defect rate may be reduced.

Although some embodiments of the inventive concept have been described above, the above embodiments should be considered in a descriptive sense only and not for purposes of limitation. Also, those of ordinary skill in the art will understand that various changes or modifications may be made therein without departing from the spirit and scope of the inventive concept.

The scope of the inventive concept should not be limited to the above description but should be defined by the following claims, and all changes and modifications falling within the equivalent scope of the claims will fall within the scope of the inventive concept.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A battery module mounting tray comprising:
a bottom plate configured to support a plurality of battery modules to be seated thereon; and
a bracket located on an upper surface of the bottom plate to fix the plurality of battery modules,
wherein the bracket comprises a first support unit to support a first side of the plurality of battery modules, a second support unit bent from both ends of the first support unit to support a portion of a side adjacent to the first side and located at an outermost side, the ends of the first support unit being spaced apart in a lengthwise direction of the first support unit, and a third support unit extending away from a central region of the first support unit in a lengthwise direction of the third support unit to support between the plurality of battery modules, the lengthwise direction of the third support unit being perpendicular to the lengthwise direction of the first support unit, each of the first support unit, the second support unit, and the third support unit extending along the upper surface of the bottom plate, the third support unit being in contact with the upper surface of the bottom plate along a length of the third support unit, and
wherein an end portion of the second support unit comprises a guide unit inclined outward at an angle so as to be oblique to each of the lengthwise direction of the first support unit and the lengthwise direction of the third support unit, the lengthwise direction of the first support unit being parallel with the upper surface of the bottom plate, the guide unit of the second support unit bent from both ends of the first support unit being inclined outward in opposite directions away from the third support unit and overlapping with the third support unit in the lengthwise direction of the first support unit.

2. The battery module mounting tray of claim 1, wherein the first support unit comprises a bottom portion, a top portion, and a side portion connecting the bottom portion and the top portion to form an inclined "U"-like cross-sectional shape in a plane perpendicular to the lengthwise direction of the first support unit to cover the first side of the plurality of battery modules.

3. The battery module mounting tray of claim 2, wherein a length of the bottom portion of the first support unit is greater than a length of the top portion of the first support unit.

4. The battery module mounting tray of claim 1, wherein the second support unit comprises a cutaway portion that is partially cut away, and a region of the cutaway portion is bent inward.

5. The battery module mounting tray of claim 1, wherein the third support unit is formed integrally with the first support unit.

6. The battery module mounting tray of claim 1, wherein a coupling groove is formed in the central region of the first support unit, an extension portion is formed at an end portion of the third support unit, and the extension portion is inserted and coupled into the coupling groove.

7. A battery module mounting tray comprising:
a bottom plate configured to support a plurality of battery modules to be seated thereon; and
a bracket located on an upper surface of the bottom plate to fix the plurality of battery modules,
wherein the bracket comprises a first support unit to support a first side of the plurality of battery modules, a second support unit bent from both ends of the first support unit to support a portion of a side adjacent to the first side and located at an outermost side, and a third support unit extending away from a central region of the first support unit to support between the plurality of battery modules, each of the first support unit, the second support unit, and the third support unit extending along the upper surface of the bottom plate, the third support unit being in contact with the upper surface of the bottom plate along a length of the third support unit,
wherein an end portion of the second support unit comprises a guide unit inclined outward at an angle so as to be oblique to each of a lengthwise direction of the first support unit and a lengthwise direction of the third support unit, the lengthwise direction of the first support unit being parallel with the upper surface of the bottom plate, the guide unit of the second support unit bent from both ends of the first support unit being inclined outward in opposite directions away from the third support unit and overlapping with the third support unit in the lengthwise direction of the first support unit, and
wherein the third support unit has a U-shaped cross-sectional shape in a plane perpendicular to a lengthwise direction of the third support unit, and comprises a base portion contacting the bottom plate and a pair of sidewall portions extending upward along a lengthwise direction of the base portion to contact the plurality of battery modules.

8. The battery module mounting tray of claim 7, wherein the base portion of the third support unit is welded to the bottom plate.

9. The battery module mounting tray of claim 8, wherein the base portion of the third support unit has a thickness of at least about 0.8 mm.

10. The battery module mounting tray of claim 8, wherein a thickness of the base portion of the third support unit is less than or equal to a thickness of the bottom plate.

11. A battery module mounting tray comprising:
a bottom plate configured to support a plurality of battery modules to be seated thereon; and
a bracket located on an upper surface of the bottom plate to fix the plurality of battery modules,
wherein the bracket comprises a first support unit to support a first side of the plurality of battery modules, a second support unit bent from both ends of the first support unit to support a portion of a side adjacent to the first side and located at an outermost side, the ends of the first support unit being spaced apart in a lengthwise direction of the first support unit, and a third support unit extending away from a central region of the first support unit in a lengthwise direction of the third support unit to support between the plurality of battery modules, the lengthwise direction of the third support unit being perpendicular to the lengthwise direction of the first support unit, each of the first support unit, the second support unit, and the third support unit extending along the upper surface of the bottom plate, the third support unit being in contact with the upper surface of the bottom plate along a length of the third support unit, and the third support unit extending longer than the second support unit in the lengthwise direction of the third support unit, and
wherein an end portion of the second support unit comprises a guide unit inclined outward at an angle so as to be oblique to each of the lengthwise direction of the first support unit and the lengthwise direction of the third support unit, the guide unit of the second support unit bent from both ends of the first support unit being inclined outward in opposite directions away from the third support unit.

12. The battery module mounting tray of claim 11, wherein the third support unit has a U-shaped cross-sectional shape in a plane perpendicular to a lengthwise direction of the third support unit, and comprises a base portion contacting the bottom plate and a pair of sidewall portions extending upward along a lengthwise direction of the base portion to contact the plurality of battery modules.

\* \* \* \* \*